(12) United States Patent
Fernandez et al.

(10) Patent No.: US 10,837,142 B2
(45) Date of Patent: Nov. 17, 2020

(54) PAPER COATING COMPOSITION WITH HIGHLY MODIFIED STARCHES

(71) Applicant: SAPPI NORTH AMERICA, INC., Boston, MA (US)

(72) Inventors: Joseph M. Fernandez, Buxton, ME (US); Arbin Rajbanshi, Gorham, ME (US); Qi Wang, Gorham, ME (US)

(73) Assignee: SAPPI NORTH AMERICA, INC., Boston, MA (US)

(*) Notice: Subject to any disclaimer, the term of this patent is extended or adjusted under 35 U.S.C. 154(b) by 81 days.

(21) Appl. No.: 16/221,108

(22) Filed: Dec. 14, 2018

(65) Prior Publication Data

US 2020/0190740 A1 Jun. 18, 2020

(51) Int. Cl.
| | | |
|---|---|---|
| *D21H 19/00* | (2006.01) |
| *D21H 19/54* | (2006.01) |
| *C08B 30/12* | (2006.01) |
| *C08B 31/02* | (2006.01) |
| *C08B 31/10* | (2006.01) |
| *D21H 19/58* | (2006.01) |
| *C09D 103/02* | (2006.01) |
| *C09D 109/08* | (2006.01) |
| *C09D 131/04* | (2006.01) |
| *C09D 155/02* | (2006.01) |

(52) U.S. Cl.
CPC ............ *D21H 19/54* (2013.01); *C08B 30/12* (2013.01); *C08B 31/02* (2013.01); *C08B 31/10* (2013.01); *D21H 19/58* (2013.01); *C09D 103/02* (2013.01); *C09D 109/08* (2013.01); *C09D 131/04* (2013.01); *C09D 155/02* (2013.01)

(58) Field of Classification Search
None
See application file for complete search history.

(56) References Cited

U.S. PATENT DOCUMENTS

| | | | |
|---|---|---|---|
| 2,516,632 A | 7/1950 | Kesler et al. | |
| 2,516,633 A | 7/1950 | Kesler et al. | |
| 3,378,546 A | 4/1968 | Tsuzuki | |
| 3,553,196 A * | 1/1971 | Mark | ...................... C08B 33/02 536/110 |
| 4,048,434 A | 9/1977 | Speakman | |
| 4,425,452 A | 1/1984 | Nakata et al. | |

(Continued)

FOREIGN PATENT DOCUMENTS

| | | |
|---|---|---|
| CN | 103421123 A | 12/2013 |
| CN | 107663242 A | 2/2018 |

(Continued)

OTHER PUBLICATIONS

IGT Testing Systems, "IGT Information Leaflet W32 Wet Pic/ Wet Repellence (rubber 85 Shore A) IGT AIC2-5T2000, Global Standard Tester 2", Jul. 2006, 2 pages.
Nancy Plowman Associates, Inc., "The Paper & Ink Stability Test", Technical Notes, available online Oct. 10, 2018, 2 pages.
International Patent Application No. PCT/US2019/066217, International Search Report dated Jun. 15, 2020, 5 pages.

(Continued)

*Primary Examiner* — Stefanie J Cohen
(74) *Attorney, Agent, or Firm* — Leber IP Law; Celia H. Leber

(57) ABSTRACT

Coating compositions, including high degree of substitution (DS), viscosity optimized starches, are disclosed for use in non-barrier paper coatings. Paper coated with the same is disclosed as well as methods of making the coating compositions and coated papers.

15 Claims, 4 Drawing Sheets

(56) References Cited

U.S. PATENT DOCUMENTS

| | | | |
|---|---|---|---|
| 4,451,649 A | | 5/1984 | Teubner et al. |
| 4,762,772 A | * | 8/1988 | Kobayashi ............... B41N 3/08 |
| | | | 101/451 |
| 6,210,475 B1 | * | 4/2001 | Dauplaise ............... D21H 21/16 |
| | | | 106/209.1 |
| 6,512,108 B2 | | 1/2003 | Albrecht et al. |
| 6,521,088 B1 | | 2/2003 | Richardson et al. |
| 6,670,470 B1 | * | 12/2003 | Ketola ............... C08B 31/006 |
| | | | 106/162.7 |
| 6,777,075 B2 | | 8/2004 | Concannon et al. |
| 7,041,175 B1 | | 5/2006 | Sommermeyer et al. |
| 9,157,187 B2 | | 10/2015 | Bloembergen |
| 2006/0032400 A1 | * | 2/2006 | Henning ............... A61M 1/287 |
| | | | 106/162.5 |
| 2007/0110799 A1 | * | 5/2007 | Leferve ............... A23B 7/16 |
| | | | 424/451 |
| 2009/0314183 A1 | | 12/2009 | Tripathi |
| 2010/0126381 A1 | * | 5/2010 | Paris ............... C09D 103/00 |
| | | | 106/162.9 |
| 2011/0223401 A1 | | 9/2011 | Harlin et al. |
| 2014/0370273 A1 | * | 12/2014 | Lyons ............... D21H 19/58 |
| | | | 428/330 |

FOREIGN PATENT DOCUMENTS

| | | |
|---|---|---|
| CN | 108003248 A | 5/2018 |
| EP | 0776767 A1 | 6/1997 |
| EP | 1176255 A1 | 1/2002 |
| EP | 1964969 A1 | 9/2008 |
| EP | 2554743 A1 | 2/2013 |
| GB | 1185144 A | 3/1970 |
| GB | 1412422 A | 11/1975 |
| WO | 9400514 A1 | 1/1994 |
| WO | 0118311 A1 | 3/2001 |
| WO | 2011131330 | 10/2011 |
| WO | 2015183939 | 12/2015 |

OTHER PUBLICATIONS

International Patent Application No. PCT/US2019/066217, Written Opinion dated Jun. 15, 2020, 6 pages.
International Patent Application No. PCT/US2019/066230, International Search Report dated Mar. 27, 2020, 4 pages.
International Patent Application No. PCT/US2019/066230, Written Opinion dated Mar. 27, 2020, 6 pages.

* cited by examiner

PAPER COATING COMPOSITION WITH HIGHLY MODIFIED STARCHES

BACKGROUND

Paper and paperboard manufacturers use considerable amounts of synthetic latex binder in their coating compositions. It would be beneficial both economically and environmentally if these expensive synthetic binders could be replaced by low cost starches with resulting products having equal performance.

Starch has been used as a cost-effective and renewable pigment binder for paper coating applications for many years. However, starch has performance shortcomings when used as a paper coating binder including brittleness, moisture sensitivity, poor strength, low binding strength, and poor printability such as high back trap mottle and low ink film continuity.

Chemical and physical starch modifications have managed to address various combinations of these coating starch shortcomings, however, these modifications increase the cost of the starch. Examples of such modifications include copolymerization with other film-forming monomers, emulsified starch-synthetic grafting, functionalization of the starch backbone, cross-linking, degradation by hydrolysis, and the development of nano-sized starches. For example, Published PCT Application No. WO 2011/131330 discloses the use of hydrolyzed and non-hydrolyzed starches in coatings, but does not discuss or suggest a particular degree of substitution (DS) for the starches.

Thus, hydroxyethylated and other modified starches such as oxidized and acetylated starches as well as enzyme degraded starches have been used as co-binders with synthetic latex for paper coating applications. Hydroxyalkylation of starches is one of the common methods for the modification of starches, in which the starches are treated with alkylene oxides under controlled conditions. U.S. Pat. Nos. 2,516,632 and 2,516,633 to Kesler et al., U.S. Pat. No. 3,378,546 to Tsuzuki, Published PCT Application No. WO 2015/183939A1 to Kerwood et al., and U.S. Pat. No. 4,048,434 to Speakman described the methods for preparing hydroxyalkylated starch. The main purpose for the introduction of hydroxyalkyl moieties into starch is to minimize its propensity to undergo retrogradation, increasing the stability of its solution. The commercially available hydroxyalkylated starches, especially hydroxyethylated starches which are widely used in the paper industry for coating applications, usually have a low degree of substitution (DS).

US Published Patent Application 20090314183 by S.D. Warren Company (Tripathi), Published PCT Application No. WO 2005047385A1 by Cargill, Incorporated, US Published Patent Application 20170081541A1 by Cargill, Incorporated (thermally modified products, C-Star® Films), U.S. Pat. No. 9,157,187B2 by EcoSynthetix Inc., and U.S. Pat. No. 6,521,088 by National Starch and Chemical Company (acetylated starch products, Kofilm®) disclose modified starches other than hydroxyalkyated starches that are also used as co-binders with synthetic latex.

The replacement of synthetic latexes with current commercially available starches in coating, however, results in various undesirable effects such as increased coating viscosity, increased paper hydrophilicity that induces print defects, decreased paper gloss, and decreased paper flexibility (e.g., poor performance on the crack at the fold). These drawbacks limit the use of starch despite its low price compared to synthetic latex.

Modified high molecular weight and crosslinked starches with high DS, though available, are used for food and barrier applications especially in packaging. European Patent No. 547551B1 describes use of high amylose starches modified by 1 to 25% by weight of propylene oxide as edible films for food and pharmaceutical applications. U.S. Pat. No. 6,512,108 describes use of hydroxypropylated high amylose pea starches with a DS of 0.1 to 1.0 as grease barriers. US Patent Application Publication No. 2011/0223401A1 describes the use of hydroxyalkylated starches as ingredients of barrier coatings for paper and paperboard applications.

Barrier coatings for paper and paperboard are designed to provide a barrier against various elements (e.g., water vapor, oxygen, moisture, oil and grease) and hence benefit from the high molecular weights of these modified starches in preventing penetration through the coating layer. Because barrier coatings are designed to repel, among other things, water and/or oil, they would also repel printing inks and fountain solutions. Therefore, barrier coatings render the paper and paperboard unsuitable for printing applications. Furthermore, the viscosities of high molecular weight starches used in barrier coatings are too high for printing paper coating applications.

For use in non-barrier paper coatings (i.e., printing paper and paperboard), these modified high molecular weight starches with high DS are expensive and yield emulsions with unacceptable rheology, i.e., higher than acceptable viscosities for the coatings. Modified low DS starches have been degraded to obtain an optimal coating viscosity, i.e., to lower the molecular weight. However, coatings made with high latex substitution levels with these low viscosity low DS starches exhibit poor paper properties. Thus, one of ordinary skill in the art was dissuaded from degrading modified high DS starches to lower their viscosities for use in non-barrier paper coatings.

SUMMARY

The invention relates to a coating composition including a modified starch and at least one pigment, where the modified starch has a degree of substitution from 0.12 to 3 and a cooked starch viscosity of 3 to 35 cps and the viscosity is measured at 10 wt % solids, 100 rpm and 25° C. using a Brookfield viscometer.

The invention further relates to a coated product including the coating composition layered on at least one surface of a substrate and methods of making the same.

DETAILED DESCRIPTION

Figure 1:
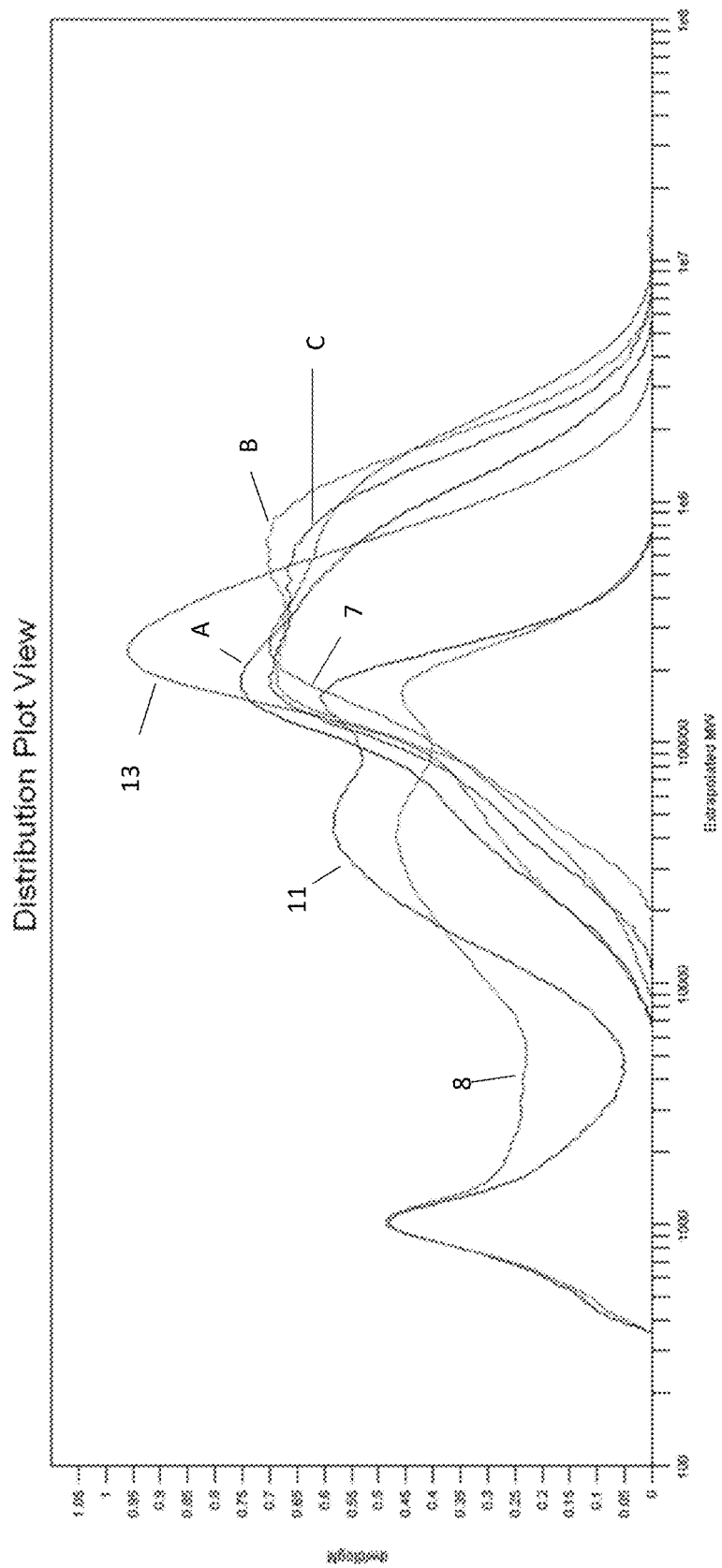
FIG. 1 is a chart showing molecular size distribution for various propylene oxide (PO)-modified and degraded starches made in accordance with the present invention.

The present invention is based on the discovery that when a high DS, viscosity optimized starch replaces a low DS starch and a portion of synthetic latex in a paper coating formulation, the resulting coated paper exhibits improved paper gloss, ink gloss, and smoothness without detrimental changes in other paper properties. In contrast, when a low DS starch replaces a significant portion of synthetic latex in a paper coating formulation, the resulting coated paper exhibits reduced paper gloss, ink gloss, and smoothness and detrimental changes in other paper properties, such as the rate of ink tack build-up and number of printing passes at failure, were observed. Moreover, the rheology offered by the coatings containing these high DS modified starches can allow for increased coating solids which are desirable from a paper quality, environmental, and economic standpoint. Coatings, in which a high DS starch replaces a low DS starch and replaces a portion of synthetic latex, also (1) have greater coating stability compared to coatings, in which a low DS starch replaces the same portion of synthetic latex and (2) have similar stability compared to a coating with no starch replacements.

Highly Modified Starches and Method of Making the Same

Modified starches used as, e.g., binders in the present invention include hydroxyalkylated starches (e.g., hydroxypropylated starches or hydroxyethylated starches), etherified starches, hydrophobically modified starches (e.g., esterified starches or alkylated starches) or a combination thereof. Etherified starches can have substituted groups with the moieties containing 2-24 carbons. Modified starches further include, without limitation, cross-linked starches; acetylated starches; alkoxylated starches (particularly ethoxylated and propoxylated starches); ethylated starches; oxidized starches; phosphorylated starches; cationic, anionic, non-ionic, and zwitterionic starches; and succinate and substituted succinate starch derivatives. Modifications include physical or chemical modification of the base starch. More than one modification or type of modification may occur on a single base starch.

Modified starches can have a degree of substitution (DS) ranging from 0.12 to 3, 0.12 to 2, 0.12 to 1, 0.12 to 0.5, 0.12 to 0.4, 0.12 to 0.3, 0.12 to 0.25, 0.12 to 0.22, 0.15 to 3, 0.15 to 2, 0.15 to 1, 0.15 to 0.5, 0.15 to 0.4, 0.15 to 0.3, 0.15 to 0.25, 0.15 to 0.22, 0.17 to 3, 0.17 to 2, 0.17 to 1, 0.17 to 0.5, 0.17 to 0.4, 0.17 to 0.3, 0.17 to 0.25, and 0.17 to 0.22. The DS of a starch is the average number of modified hydroxyl groups in an anhydroglucose unit (AGU) of starch. Since each AGU has a maximum of 3 hydroxyl groups that can be modified, the maximum DS is 3. The DS of modified starch is determined, e.g., by integrating the proton signals in a H-NMR spectrum. An alternate method could be to degrade the substituted group and measure it via FT-IR, UV, or chromatographic techniques.

Modified starches can have a cooked starch viscosity of 3 to 35 cps, 3 to 30 cps, 3 to 28 cps, 3 to 25 cps, 3 to 20 cps, 3 to 15 cps, 3 to 10, 4 to 35 cps, 4 to 30 cps, 4 to 28 cps, 4 to 25 cps, 4 to 20 cps, 4 to 15 cps, or 4 to 10 cps when viscosity is measured at 10 wt % solids, 100 rpm and 25° C. using a Brookfield viscometer. A "cooked starch viscosity" is measured after dispersing and cooking a starch in water at 90-100° C. for 10-15 minutes followed by optional cooling of the starch to the temperature of viscosity measurements.

Modified starches can be granular or pregelatinized.

As used herein, the term "starch" used for modification includes any known starch or flour. Starches useful for modification described herein can be derived from any native source, as well as starches derived from plants obtained by standard breeding techniques, such as cross-breeding, translocation, inversion, transformation, or any other method of gene or chromosome engineering that include variations thereof. Additionally, starches derived from plants grown from artificial mutations or variations of the above generic composition produced by known standard methods of mutation breeding are also suitable for modification.

Typical sources of starches include cereals, tubers, roots, legumes, and fruits. Examples of starch sources include corn, pea, potato, sweet potato, banana, barley, wheat, maize (corn), rice, sago, amaranth, tapioca, arrowroot, canna, chickpea, sorghum, and waxy or high amylose varieties thereof, or a combination thereof. Waxy versions of these, especially maize, tapioca, and potato, are useful. The term "waxy" is intended to indicate a starch material that is high in amylopectin such as a starch containing greater than 90% by weight, and preferably greater than 95%, or even 99%, amylopectin and the term "high amylose" is intended to indicate a starch containing at least about 40% by weight amylose. As used herein, the term "normal starch" refers to starches that are non-waxy and non-high amylose starches. In some embodiments, the starch source is a highly branched form of starch comprising both alpha-1,4 and alpha-1,6 glycosidic linkages. A starting starch material can be debranched, such as through treatment with isoamylase, or otherwise modified from its native form. A debranched starch can be high in amylose and comprise primarily alpha-1,4 glycosidic linkages. Dent corn starches can also be used for modification. The starches are commercially available from Tate & Lyle PLC (Decatur, Ill.), Archer Daniels Midland Company (Decatur, Ill.), Ingredion Incorporated (Westchester, Ill.), Genuine Parts Company (Muscatine, Iowa), Roquette America, Inc. (Keokuk, Iowa), Cargill Incorporated (Minneapolis, Minn.), and MGP Ingredients, Inc. (Atchison, Kans.).

Starches can be substituted, e.g., hydroxyalkylated, and then their viscosities are reduced, e.g., using acid or enzymatic hydrolysis, prior to their use in coating compositions. However, viscosity reduction followed by substitution can also be performed. U.S. application Ser. No. 16/220,578 filed on Dec. 14, 2018 entitled "DEGRADED HYDROXYALKYLATED STARCHES AND METHODS OF PREPARATION" invented by Yong-Cheng Shi, Arbin Rajbanshi, Qi Wang, Joseph M. Fernandez, and Zhenhua Sun and assigned to Kansas State University Research Foundation and Sappi North America, Inc., incorporated by reference in its entirety herein, also discusses the substitution and viscosity optimization of starches.

The ordering of these steps can affect the properties of the final starch product. For example, the acid conversion of the starch may occur prior to hydroxyalkylation using an alkylene oxide. If the acid conversion step occurs first, the starch is capable of being degraded more than if the starch is degraded following the reaction with the alkylene oxide. Likewise, the enzymatic hydrolysis step may occur prior to reaction with the alkylene oxide or after. However, it is preferable that the enzymatic hydrolysis occur after reaction of the starch with the alkylene oxide so that unreacted alkylene oxide can be removed from the slurry by a filtration process.

As can be seen in the data presented in the Examples below, the distribution of the substituted group (e.g., the hydroxypropyl group) in the final starch products made by the approaches described herein would be different. The selection of which approach to utilize would depend on the desired viscosity, solution stability, film forming properties, and coating performance for the starch material. It has been observed that when the propylene oxide is reacted with a granular starch, the hydroxypropylation occurred mainly in the amorphous regions of the starch granules. In addition, the selection of the starting base starch affects the final properties of the modified starch. For example, waxy corn starch produces better solution stability. However, normal starch has the advantage that it is generally a less expensive starting material.

Hydroxyalkyl Substitution.

The starches can be treated with high levels of alkylene oxides resulting in products having the desired degree of substitution (DS). The background section of the present application lists references that disclose methods for preparing hydroxyalkylated starch with both low and high DS. For example, U.S. Pat. No. 3,378,546 and Published PCT Application No. WO 2015/183939A1 disclose methods of making a hydroxypropyl starch ether. Further disclosure regarding modified starches and their preparation are described in the art. See, e.g., Whistler, R. L., BeMiller, J. N. and Paschall E. F., STARCH CHEMISTRY AND TECHNOLOGY, $2^{nd}$ Ed., Academic Press, Inc., London, Ch. 9, § 3, pp. 324-349 (1984); MODIFIED STARCHES: PROPERTIES AND USES, Wurzburg, O. B., Editor, CRC Press, Inc., Florida (1986). The reaction of the degraded or non-degraded starch molecules with the alkylene oxide is conducted in an aqueous slurry, typically, if the desired DS level is <0.3%. Alternative processes using non-aqueous solvents exist to manufacture starch at DS levels of, for example, >0.3%. An example of one of these processes is found in U.S. Pat. No. 4,451,649 (Assignee: Wolff Walsrode Aktiengesellschaft). In this patent, very high levels of propylene oxide (reagent and co-solvent) are reacted with starch (~130% on starch) and a very low water content (~1.5%) at 70° C. and a high reactor pressure (2-2.5 bar). DS levels ranged from 0.4 to 0.8. Additive examples claim use of isopropanol as an additional co-solvent. In certain embodiments, the solids content of the starch slurry is at least 10%, at least 15%, at least 20%, at least 25%, at least 30%, or at least 35% by weight, but less than 70%, less than 65%, less than 60%, less than 55%, less than 50%, or less than 45% by weight. Preferably, the solids content of the starch slurry is about 40% by weight. Hydroxyalkylated starches can be formed using previously-modified starches as a starting material as opposed to native starches. The previously modified starch can be a previously-degraded starch or an oxidized starch.

A quantity of sodium sulfate can be added to the starch slurry. Sodium sulfate is primarily used during starch modification to prevent premature swelling or gelatinization of the starch when temperature and pH are increased as a part of the modification process. In certain embodiments, the sodium sulfate is added to the starch slurry in an amount of from about 1% to about 25% by weight, from about 5% to about 20% by weight, or from about 7.5% to about 15% by weight, based on the solids content of the slurry. Preferably, the sodium sulfate is present at a level of about 10% by weight.

Next, the pH of the starch slurry is adjusted to alkaline levels, preferably from a pH of about 10 to about 12, most preferably about 11. Any base may be used. Sodium hydroxide is a preferred pH adjusting agent.

An alkylene oxide is then added to the slurry. In preferred embodiments, the alkylene oxide is selected from the group consisting of ethylene oxide (EO), propylene oxide (PO), and butylene oxide, with propylene oxide being most preferred. In certain embodiments, the alkylene oxide is added at a level of from about 1% to about 25% by weight, or from about 5% to about 20% by weight, or from about 7.5% to about 15% by weight, based on the solids content of the slurry. Preferably, the alkylene oxide is present at a level of about 10% by weight.

The reaction between the alkylene oxide and starch in the slurry is carried out at a temperature close to the gelatinization temperature of the starch, but preferably not exceeding the gelatinization temperature of the starch. In certain embodiments, the reaction is carried out at a temperature of from about 25° C. to about 75° C., or from about 30° C. to about 70° C., or from about 35° C. to about 65° C. Most preferably the reaction with the alkylene oxide is carried out at a temperature of about 50° C. In certain embodiments, when a waxy starch is used, the reaction temperature with the alkylene oxide may be slightly lower than if a non-waxy starch is used. In this case, the preferred reaction temperature when using a waxy starch is about 43° C. The alkylene oxide reaction is carried out for a period of about 2 to about 36 hours, and preferably about 12-24 hours.

Following the reaction, the starch slurry is permitted to cool and is neutralized via addition of an acid, such as sulfuric acid, so that the slurry has a pH of from about 4.5 to about 7, or from about 5 to about 6, or about 5.5.

Degradation.

The starches can also be degraded to reduce their molecular weights and viscosities, e.g., by exposing the starches to a mineral acid or an enzyme using methods such as disclosed in U.S. Pat. No. 4,425,452. Other methods of degradation can be employed to form the degraded starch. For example, the starch may be degraded by dextrinization (treatment with heat and/or acid in a dry, non-slurried state) or oxidation. Prior to degradation, the starches have a cooked starch viscosity in excess of 3,000 cps when viscosity is measured at 10 wt % solids, 100 rpm and 25° C. using a Brookfield viscometer. Practitioners skilled in the art know that 3,000 cps is the limit of this Brookfield viscosity test. Therefore, the viscosity cannot be measured accurately using this test. After degradation, the starches can have a cooked starch viscosity, for example, of 4-28 cps when viscosity is measured at 10 wt % solids, 100 rpm and 25° C. using a Brookfield viscometer.

Acid Conversion.

The acid conversion step cleaves starch molecules, and as a result, reduces the molecular weight of the starch and the viscosity of the cooked starch. The acid cleaves both alpha-1,4 and alpha-1,6 bonds in starch molecules. However, in embodiments in which starch granules are used as the starting starch material, the acid hydrolysis tends to occur mainly in the amorphous regions of the starch granules. Hydrochloric acid is a preferred acid for carrying out the acid conversion of starch.

To begin the acid conversion, the starch, which may or may not have already undergone hydroxyalkylation, is dispersed in an aqueous slurry. In certain embodiments, the solids content of the starch slurry is at least 10%, at least 15%, at least 20%, at least 25%, at least 30%, or at least 35% by weight, but less than 70%, less than 65%, less than 60%, less than 55%, less than 50%, or less than 45% by weight. Preferably, the solids content of the starch slurry is about 40% by weight.

The acid is added to the slurry in an amount of from about 1.5% to about 7.5% by weight, or from about 3% to about 6% by weight, based on the solids content of the slurry. In certain embodiments, the acid conversion is carried out under mildly-elevated temperature conditions, close to the gelatinization temperature of the starch, preferably from about 25° C. to about 75° C., or from about 30° C. to about 70° C., or from about 35° C. to about 65° C. Most preferably the acid conversion is carried out at a temperature of about 40-50° C. In certain embodiments, the acid conversion process is carried out at temperatures that are less than the gelatinization of the starch to avoid the swelling of the starch granules. If the starch granules swell during this step, recovery of the acid-converted starch, particularly via a filtration process, would be difficult. The acid conversion is preferably carried out for a period of about 6 to about 18 hours. After acid conversion, the solution is neutralized to a pH of about 6 by addition of a base, such as sodium hydroxide.

Enzymatic Hydrolysis.

The enzymatic hydrolysis is preferably carried out with alpha-amylase. Alpha-amylase cleaves only alpha-1,4 linkages in starch molecules, but not alpha-1,6 linkages. Therefore, the starch prepared with enzymatic hydrolysis as a part of the approach will have different molecular configurations than if acid conversion was used. The pH of the aqueous slurry can be adjusted, prior to the addition of the amylase enzyme, to be within a range in which the amylase enzyme is most effective in hydrolyzing glycoside linkages within the starch molecule, such as for example a pH from 6.1 to 6.4. In certain embodiments, alpha-amylase is added to the starch slurry in an amount of from about 0.01% to about 1%, from about 0.05% to about 0.5%, or from about 0.1% to about 0.25%, based upon the dry weight of the starch in the slurry. In particular embodiments, if a waxy starch is selected, a greater amount of alpha-amylase may be used compared to the same amount of a normal starch. In certain embodiments, the alpha-amylase acts upon the starch at higher temperatures than compared to the acid conversion process. In certain embodiments, the enzymatic hydrolysis is conducted at a slurry temperature of from about 65° C. to about 90° C., or from about 70° C. to about 85° C., or preferably about 80° C. Thus, unlike the acid-conversion process, the starch undergoing enzymatic hydrolysis tends to be gelatinized. Starch gelatinization is a process of breaking down the intermolecular bonds of starch molecules in the presence of water and heat, allowing the hydrogen bonding sites (the hydroxyl and oxygen) to engage more water. This irreversibly dissolves the starch granule in water. Therefore, in contrast to certain embodiments of the acid conversion process, the starch undergoing enzymatic hydrolysis is gelatinized and cleavage of the alpha-1,4 glycoside linkages is not confined to the amorphous regions. The alpha-amylase cleaves alpha-1,4 glycoside linkages throughout the whole gelatinized starch molecules. The enzymatic hydrolysis is preferably carried out until the starch slurry exhibits desired viscosity characteristics.

Filtering and Washing.

After each processing step (e.g., hydroxyalkylation or degradation), the starch can be filtered and washed, preferably more than once, to remove reagents that were added as a part of the processing step. Finally, after each processing step, the starch may be dried by any means conventional in the art. In certain embodiments, it is preferably to dry the alkylene oxide-modified starch and/or acid-converted starch using an oven operating at a temperature of from about 35° C. to 50° C., more preferably about 40° C. In certain embodiments, it is preferable to dry the enzymatically degraded starch using spray drying equipment, as the starch granules have been destroyed as a part of the enzymatic degrading process.

Coating Compositions Containing Modified Starch as a Binder and Methods of Making the Same A coating composition for use, e.g., as an image receptive coating for printing paper and paperboard includes a modified starch as described herein as, e.g., a binder and at least one pigment. Printing paper and paperboard may have one or more coating layers per side. As used herein, the "precoat" layer is the first coating layer (excluding surface sizing), the "topcoat" layer is the image receptive layer for printing, and the "middlecoat" layer, if any, is a layer between the precoat and topcoat layers. Table 1 provides example coating compositions and example coating information for these coating layers.

The term "parts," as used herein, means parts on a dry solids basis, and, as is well known in the art, parts are based on 100 parts of pigment. The coating composition can be 1 to 50 parts, 10 to 50 parts, 1 to 25 parts, 1 to 30 parts, 10 to 30 parts, 1 to 15 parts, 5 to 25 parts, 4 to 15 parts, 3 to 10 parts, 3 to 15 parts, 3 to 20 parts, 1 to 12 part or 1 to 10 parts by weight of modified starch based on 100 parts by weight of total pigment.

TABLE 1

|  | Precoat | Middle-coat | Topcoat |
| --- | --- | --- | --- |
| Total Pigment (dry parts by weight) | 100 | 100 | 100 |
| Latex Binder (dry parts by weight) | 5-18 | 4-16 | 3-14 |
| Starch Binder (dry parts by weight) | 4-15 | 3-10 | 1-12 |
| Total Binder (dry parts by weight) | 15-30 | 6-18 | 6-16 |
| Additives (dry parts by weight) | <3 | <3 | <3 |
| Coating Solids (% by weight) | 45-65 | 62-72 | 65-72 |
| Coat Weight per side (gsm) | 3-15 | 7-15 | 7-19 |
| Coating Viscosity Range (cps) (Brookfield, 100 RPM @ 35 C.) | 400-1500 | 400-3500 | 400-3500 |

Synthetic latex can also be used as a binder in a coating composition. Typical monomers used in the production of latex polymers include styrene, butadiene, vinyl acetate, ethylene, acrylonitrile, butyl acrylate, methyl methacrylate, vinyl acrylate, isoprene, or a combination thereof. The synthetic latex can be styrene-butadiene, styrene-butadiene-acrylonitrile, styrene-acrylic, styrene-butadiene-acrylonitrile, styrene-butadiene-acrylic, vinyl acetate, vinyl acetate acrylic, vinyl acetate ethylene, vinyl acrylate, or a mixture thereof. The mean particle size of the latex particles typically used in binders for the manufacture of coated printing sheets is generally about 400 to 2,400 angstroms. Examples of suitable latexes include: CP 620NA and CP 615NA, manufactured by Trinseo S.A.; GenFlo® 557 and GenFlo® 576, manufactured by OMNOVA Solutions Inc.; Acronal® S 504 and Acronal® S 728, manufactured by BASF Corporation; and Vinnapas® 100HS manufactured by Wacker Chemical Corporation.

The coating composition can be 1 to 50 parts, 1 to 25 parts, 1 to 10 parts, 5 to 18 parts, 4 to 16 parts, 3 to 14 parts, 3 to 18 parts, 5 to 20 parts, 1 to 15 parts, 5 to 20 parts, 2 to 7 parts, 3 to 6 parts, 1 to 5, or 3 to 5 parts by weight of synthetic latex based on 100 parts by weight of total pigment. In the coating composition, the parts by weight of modified starch based on 100 parts by weight of total pigment can be greater than or equal to the parts by weight of synthetic latex based on 100 parts by weight of total pigment. The ratio of the parts by weight of synthetic latex based on 100 parts by weight of total pigment to the parts by weight of modified starch based on 100 parts by weight of total pigment can be from 9:1 to greater than 0:10, 4:1 to greater than 0:10, 7:3 to greater than 0:10, 3:2 to greater than 0:10, 1:1 to greater than 0:10, 2:3 to greater than 0:10, 3:7 to greater than 0:10, 1:4 to greater than 0:10, 1:9 to greater than 0:10, 9:1 to 1:9, 4:1 to 1:9, 7:3 to 1:9, 3:2 to 1:9, 1:1 to 1:9, 2:3 to 1:9, 3:7 to 1:9, 1:4 to 1:9, 9:1 to 1:4, 4:1 to 1:4, 7:3 to 1:4, 3:2 to 1:4, 1:1 to 1:4, 2:3 to 1:4, 3:7 to 1:4, 9:1 to 3:7, 4:1 to 3:7, 7:3 to 3:7, 3:2 to 3:7, 1:1 to 3:7, 2:3 to 3:7, 9:1 to 2:3, 4:1 to 2:3, 7:3 to 2:3, 3:2 to 2:3, 1:1 to 2:3, 9:1 to 1:1,4:1 to 1:1, 7:3 to 1:1, 3:2 to 1:1, 9:1 to 3:2, 4:1 to 3:2, 7:3 to 3:2, 9:1 to 7:3, 4:1 to 7:3, or 9:1 to 4:1.

Modified starches can be used to replace synthetic latexes up to 10 wt %, 20 wt %, 30 wt %, 40 wt %, 50 wt %, 60 wt %, 70 wt %, 80 wt %, 90 wt %, or 100 wt % depending on the paper/paperboard grade, the coating layer, coating formulation design, and the coating application. Thus, no synthetic latex is required to be in the coating composition, i.e., the coating composition does not need to contain synthetic latex.

The binder ingredients can also include polyacrylate salt, polyvinyl alcohol, protein (e.g., soy, casein), carboxymethyl cellulose, hydroxymethyl cellulose or a mixture thereof. The coating composition can include 5 to 30 parts, 15 to 30 parts, 6 to 18 parts, 6 to 16 parts, or 5 to 20 parts by weight of total binder ingredients, based on 100 parts by weight of total pigment.

In addition to a binder, coating compositions include inorganic pigments, organic pigments, cross-linkers, and a mixture thereof, known to those in the art. The pigment can be a structured polymer pigment, kaolin, calcined clay, structured clay, ground calcium carbonate, precipitated calcium carbonate, titanium dioxide, aluminum trihydrate, satin white pigment, a hollow sphere plastic pigment, a solid plastic pigment, silica, zinc oxide, barium sulfate, or a mixture thereof. The average particle size, e.g., 0.4 to 2.0 micrometers, and size distribution of these pigments are typical for pigments used as coating pigments. Practitioners skilled in the art are aware of how to select the appropriate coating pigments to achieve the desired final product attributes.

Precipitated calcium carbonates are commercially available in a broad range of surface areas, average particle sizes and particle size distributions. Typically the equivalent spherical diameter (ESD) of the precipitated calcium carbonate particles is less than about 3 µm. Preferably about 80 to 95% by weight of the calcium carbonate particles have an ESD of less than about 1 µm and the average ESD is about 0.4 to 0.9 µm.

Precipitated calcium carbonates are commercially available in an array of particle shapes. The precipitated calcium carbonates can exhibit a variety of morphologies, such as aragonite (needle-shaped) and rhombohedral (cubic). Suitable precipitated calcium carbonates are manufactured by, Specialty Minerals, Inc., Omya Inc., Mississippi Lime Company, and Imerys Pigments, Inc.

Suitable plastic pigments are available as hollow or solid spheres in a range of particle sizes and, in the case of hollow sphere pigments, void volumes. Typically, the average particle size of solid plastic pigments ranges from 0.13 to 0.50 µm. Suitable solid sphere plastic pigments are commercially available from Trinseo S.A., e.g., 722HS, 788A and 756A, and from OMNOVA Solutions, Inc., e.g., Lytron® 2203. For hollow sphere plastic pigments, the average particle size typically ranges from about 0.5 to 1.0 µm with a shell thickness of about 0.06 to 0.09 µm. The hollow core diameter typically ranges from about 0.38 to 0.82 µm, resulting in void volumes of about 43% to 55%. Preferred hollow sphere plastic pigments have an average particle size of about 0.5 to 1.0 µm and a void volume of about 50% to 55%. Suitable hollow sphere plastic pigments are commercially available from The Dow Chemical Company, e.g., Ropaque® HP-1055 and Ropaque® AF-1353, and from OMNOVA Solutions, Inc., e.g., Lytron® HG80.

The coating may further include optical-related coating additives, such as colorants, tinting dyes, fluorescent brighteners, blooming agents, or a mixture thereof. Practitioners skilled in the art are aware of how to select the appropriate optical package to achieve the desired final product attributes, such as shade and brightness.

The coating may further include coating additives, such as gloss aids, dispersants, thickeners, defoamers, water retention agents, preservatives, crosslinkers, lubricants and pH control agents. Practitioners skilled in the art are aware of how to select the appropriate coating additives to meet manufacturing and production objectives, e.g., to control foam, rheology, and dusting, and to achieve the desired final product attributes. The coating composition can include less than 3 parts by weight of coating additives based on 100 parts by weight of total pigment.

The modified starch for the coating compositions described herein can be cooked in a batch or jet starch cooker as known in the art. For example, a slurry of the modified starch at 10-45 wt % or 30-35 wt % total solids is cooked in a batch or jet starch cooker to yield a cooked starch with 10-40% solids. The other coating components can be mixed prior to the addition of the cooked starch in a high shear mixer (e.g., Cowls Mixer). These cooked starches can be added to coating composition to obtain 20 wt % to 80 wt %, 45 wt % to 72 wt %, 45 wt % to 65 wt %, 62 wt % to 72 wt %, 65 wt % to 72 wt %, or 64 wt % to 70 wt % coating solids in water. Alternatively, non-granular modified starches can be dry-added to the coating composition.

The viscosities of the coating compositions can be measured. For example, the viscosity can be measured using well known TAPPI Standard Methods TAPPI T-648 om-97 (Viscosity of Coating Clay Slurry), section 7.5 for low shear Brookfield viscosity and TAPPI T-648 om-97 (Viscosity of Coating Clay Slurry), section 7.6 (test modified by using the $2^{nd}$ trace, not the $1^{st}$ one) for high shear Hercules viscosity. Typical viscosity ranges of coating compositions include 400-1500 cps and 400-3500 cps measured at 100 rpm and 35° C. using a Brookfield viscometer.

Coated Products and Methods of Making the Same

A coated paper or paperboard product can include a substrate and a coating containing a highly modified starch and at least one pigment layered on at least one surface of the substrate. These coatings can be coated on, or integrated into, a substrate material. A coating can be applied directly to a substrate or after the substrate has been subjected to sizing operation. Multiple coatings can be applied to the substrate.

The substrate can be a web composed of a fiber-based material known to those skilled in the art of manufacturing coated paper or paperboard products. Example substrates include a piece of paper, but a substrate can be any surface upon which printing is desired. The substrate can be a paper substrate of a weight and type suitable for offset printing. The basis weight of suitable substrates before application of one or more coating layers typically ranges from about 30 to 300 g/m$^2$ for paper products, and about 135 to 460 g/m$^2$ for paperboard products. Preferably the ash content of the substrate, i.e., the amount of inorganic material incorporated within the substrate, including virgin pigment material and pigment material derived from a recycled fiber component of the substrate, is about 10 to 20 wt % more preferably about 12 to 15 wt %.

A method of coating a substrate includes coating at least one surface of a substrate with a coating composition as described herein comprising a modified starch and at least one pigment. The composition can be prepared as an aqueous or other solution for application to a surface. Application of the composition can be applied using techniques and apparatus well known in the art such as, for example, a blade coater, film transfer roll, a rod coater, a pre-metered or conventional size press, an air knife coater, a curtain coater, a gate coater, a spray coater, an extruder, applicator roll, fountain, jet, short dwell, slotted die, a metering means (e.g., a bent blade, bevel blade, roll, bar, gravure, or air brush), application during a calendaring process, or a combination thereof. The solids level of the coating will typically range from about 35% to 70 wt %, 35 to 55 wt %, or 40 to 50 wt %. A lower solids level is typically used to apply a coating at a low coat weight.

The coating can be applied to both sides of the substrate to ensure that the printed images on both sides of the printing sheet are of comparable quality. The coat weight applied per coating layer per side can be 1 to 15 $g/m^2$, 3 to 15 $g/m^2$, 7 to 15 $g/m^2$, 7 to 19 $g/m^2$, or 10 to 15 $g/m^2$. The coating may be applied to one or both sides of the substrate in more than one coating layer. The coating layer is then dried, e.g., by convection, conduction, radiation, or a combination thereof. The total coat weight applied typically ranges from 4.5 to 100 $g/m^2$ for coated paper product, and about 20 to 45 $g/m^2$ for coated paperboard product. The total basis weight of the substrate after application of one or more coating layers per side typically ranges from about 35 to 355 $g/m^2$ for coated paper product, and about 155 to 488 $g/m^2$ for coated paperboard product.

After drying, a calendering step can achieve the desired level of smoothness. The calendering apparatus may be a separate supercalender, an off-line soft-nip calender, or an on-line soft-nip calendering unit. When calendaring, the nip pressures range from about 40 to 175 kN/m or about 40 to 90 kN/m, the operating roll temperature ranges from about 80 to 200° C., and the incoming web moisture is about 3 to 10 wt %. The level of calendering performed on the sheet is dependent on the desired product attributes, such as paper gloss and sheet bulk. While the smoothness of the substrate typically improves with increased calendering, other desirable properties, such as bulk, porosity, opacity and brightness, may be deleteriously affected. Practitioners skilled in the art are aware of how to select the appropriate calendering temperatures and pressures to achieve the desired substrate properties.

Coated paper products can be tested for different properties as shown in the below table.

TABLE 2

Test Methods

| | |
|---|---|
| Paper Gloss, 75 Degree | TAPPI T-480 om-15 |
| Parker Print Surf Roughness 10 KG Soft | TAPPI T-555 om-15 |
| Goemetric Lorentzen & Wettre Stiffness | TAPPI T-556 om-11 |
| Ink Gloss, 20 Degree | TAPPI T-653 om-07 |
| Rate of Ink Tack Build-Up | Lodcel Test[1] |
| Ink Force @ Failure Point | Lodcel Test[1] |
| No. of Printing Passes at Failure | Lodcel Test[1] |
| IGT Print Velocity at Failure | TAPPI T-575 om-13[2] |
| Adams Wet Rub Test | Method provided with tester[3] |

Notes:
[1]Lodcel test as described in TAGA 1992 Proceedings: Concannon, Paul W., Wilson, Larry A. (1992). A method for measuring tack build of offset printing inks on coated paper. In TAGA (Ed.) Technical Association of the Graphic Arts TAGA 1992 Proceedings (pp. 282-301). Rochester, NY: TAGA.
[2]Test modified by using a pigmented ink in place of Newtonian Oil.
[3]Kalamazoo Paper Chemical Adams Wet Rub Tester available from KPC-Horizon in North Carolina TAPPI Standard Methods are well known to those in the art.

Lodcel Test.

The lodcel test was developed by S.D. Warren Company in 1974, refined over the years and published at TAGA proceedings in 1992. The lodcel test measures the force to split an ink film between a printing blanket and paper (g/cm2/sec). The process is designed to give an indication of how a given paper and ink combination may react when subjected to the stresses of multiple printing impressions. To perform the lodcel test, a Vandercook proofing press is used. A measured layer of ink is applied to the block (length 12", depth 0.003") by a scraper, and the blanket is run over the block to split the ink film. The paper sample (2½"×10") is placed in clamps and then printed using the blanket. Every 7 seconds, the press passes over the sample (speed 100 ft./min) and the force is recorded until failure occurs (ink force at failure point) or 10 passes have passed, whichever comes first. Failure is when coating is picked from the paper surface by the force of the ink tack. The ink forces for the first and last passes are omitted and the slope (rate of ink tack build-up) is calculated based on the ink forces for the other passes.

Adams Wet Rub Test. Adams Wet Rub test measures the wet strength of coated papers by applying a uniform moisture film to the sample under repeatable friction conditions. The test is carried out using Kalamazoo Paper Chemical Adams Wet Rub Tester. The test samples (¾"×9⅜" MD) are attached to the test wheel using double-sided tape and placed with a constant load against a rubber drive wheel which runs in a small bath containing water purified by reverse osmosis for 20 seconds. The bath solution is collected, along with the rinses from the rubber driver roller and sample pan. The % transmittance of the collected solution is measured to evaluate coating material removed in the bath. The % transmittance values may range from 0 to 100, with the higher number related to lower amount of coating removed and hence stronger coated wet strength.

Coated paper products can be used for, but are not limited to, lithographic, rotogravure, and flexographic printing for graphics paper, release paper, and packaging paper applications. Coated paperboard products include but are not limited to, solid bleached sulfate (SBS), solid bleached board (SBB) and folding boxboard (FBB).

EXAMPLES

The following examples set forth preferred materials and methods according to the present invention. These examples are provided by way of illustration and nothing therein should be taken as a limitation upon the overall scope of the invention.

Example 1: Preparation and Characterization of Hydroxypropylated Degraded Starches Although the example describes the preparation and characterization of hydroxypropylated degraded starches, it is to be understood, however, that other alkylene oxides may be employed.

Materials. Waxy and normal maize starches are manufactured by Tate & Lyle PLC (Decatur, Ill.). Ethylex® 2020 (a hydroxyethyl substituted starch derived from dent corn starch) is manufactured by Tate & Lyle PLC. Propylene oxide (PO) was purchased from Sigma-Aldrich (St. Louis, Mo.). α-amylase (BAN 480L) was obtained from Novozymes North America (Franklinton, N.C.). Other chemicals were all analytical grade.

Preparation of degraded PO starch: Approach 1 (acid conversion+PO reaction).

Figure 2:
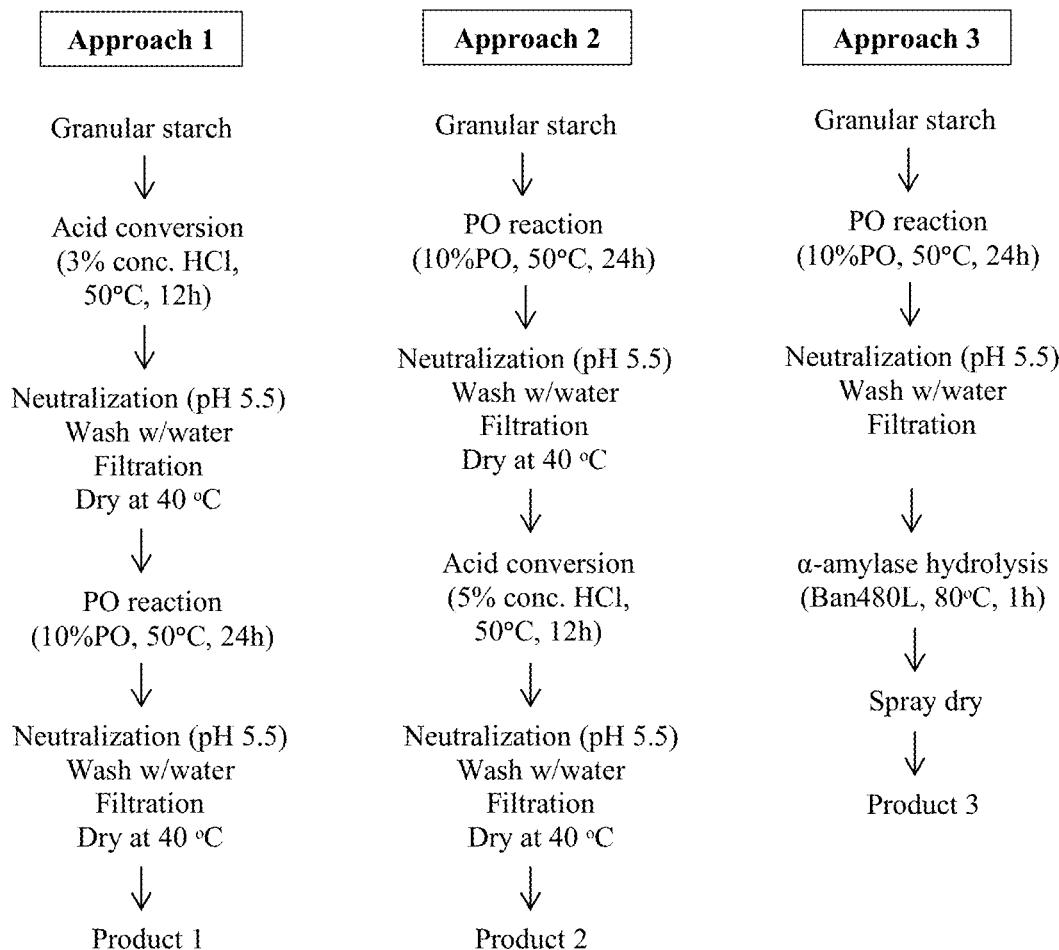
FIG. 2 contains process flow diagrams for three approaches of forming PO-modified and degraded starches in accordance with the present invention.

The preparation of degraded PO starches from Approach 1 is shown in FIG. 2. The temperature of the water bath in which the acid conversion is to take place is set to 50° C. Corn (maize) starch (500 g) is slurried into 750 g water (40% solid content) in a beaker. The starch slurry is then transferred to a jar. The jar is placed in a water bath, stirred using an overhead mixer, and allowed to equilibrate to 50° C. Concentrated HCl (3%-6%, 15-30 g) is weighed and poured into the starch slurry, and permitted to react for 6-12 hours. After 6-12 hours, the pH is adjusted to 5.5 with 3% NaOH. The pH-adjusted mixture is then filtered. The retentate is re-suspended in 750 ml of water, and the suspension is then filtered. The washing and filtration is repeated. The starch is dried in an oven at 40° C.

A water bath in which the PO reaction is to occur is set to 45-50° C. for normal corn starch (43.5° C. for waxy corn starch). The acid-converted corn starch (360 g) is slurried into 540 g water (40% solid) in a beaker and stirred using an overhead mixer. Sodium sulfate (36 g, 10% based on the weight of the starch) is added, and the slurry mixed for 15 min. The pH is adjusted to 11.2 with 3% NaOH. The slurry is poured from the beaker into a glass jar with a lid. Propylene oxide (PO) (5-10% based on the weight of the starch) is weighed in a hood and added to the starch slurry. The jar is sealed immediately. The jar is shaken in the water bath at 45-50° C. (43.5° C. for waxy corn starch) for 24 hours, after which it is allowed to cool to room temperature. The starch slurry is neutralized to pH 5.5 with 25% sulfuric acid. The slurry is filtered. The retentate is washed in 600 ml of water and filtered. The washing and filtration is repeated. The starch is dried in an oven at 40° C.

Preparation of Degraded PO Starch: Approach 2 (PO Reaction+Acid Conversion).

The preparation of degraded PO starches from Approach 2 is shown in FIG. 2. The temperature of the water bath on which the propylene oxide reaction is to take place is set to 50° C. for normal corn starch (43.5° C. for waxy corn starch). The corn starch (360 g) is suspended into 540 g water (40% solid) in a beaker and stirred using an overhead mixer. Sodium sulfate (36 g, 10% based on the weight of the starch) is added to the slurry and mixed for 15 min. The pH is adjusted to 11.2 with 3% NaOH. The slurry is poured from the beaker into a glass jar with a lid. Propylene oxide (PO) (36 g, ~43.4 mL, 10% based on the weight of the starch) is weighed in a hood and added to the starch slurry. The jar is sealed immediately and shaken in water bath at 50° C. (43.5° C. for waxy corn starch) for 24 hours, after which it is allowed to cool to room temperature. The starch slurry is neutralized to pH 5.5 with 25% sulfuric acid. The slurry is filtered. The retentate is washed in 600 ml of water and then filtered. The washing and filtration is repeated. The starch is dried in an oven at 40° C.

The water bath in which acid conversion of the starch was to be performed was set to 40° C. The PO-modified corn starch (360 g) is slurried into 540 g water (40% solid content) in a beaker. The starch slurry is transferred into a jar. The jar is placed in a water bath, stirred using an overhead mixer, and allowed to equilibrate to 50° C. Concentrated HCl (5%-7.5%, 18-40.5 g) is weighed and poured into the starch slurry. The mixture is permitted to react for 10-18 hours, after which the pH is adjusted to 5.5 with 3% NaOH. The mixture is then filtered. The retentate is re-suspended in 540 ml of water and filtered. The washing and filtration is repeated. The starch is then dried in an oven at 40° C.

Preparation of Degraded PO Starch: Approach 3 (PO Reaction+Enzyme Degradation).

For Approach 3, the temperature of the water bath on which the propylene oxide reaction is to take place is set to 50° C. for normal corn starch (43.5° C. for waxy corn starch). The corn starch (360 g) is suspended into 540 g water (40% solid) in a beaker and stirred using an overhead mixer. Sodium sulfate (36 g, 10% based on the weight of the starch) is added to the slurry and mixed for 15 min. The pH is adjusted to 11.2 with 3% NaOH. The slurry is poured from the beaker into a glass jar with a lid. Propylene oxide (PO) (36 g, ~43.4 mL, 10% based on the weight of the starch) is weighed in a hood and added to the starch slurry. The jar is sealed immediately and shaken in water bath at 50° C. (43.5° C. for waxy corn starch) for 24 hours, after which it is allowed to cool to room temperature. The starch slurry is neutralized to pH 5.5 with 25% sulfuric acid. The slurry is filtered. The retentate is washed in 600 ml of water and then filtered. The washing and filtration is repeated. The starch cake is weighed, and the moisture content of the starch cake is measured. The cake is then put back into a slurry in distilled water (18-20% solid) in a metal jar and stirred by the overhead mixer.

The temperature of a water bath was set to 80° C. The starch slurry was adjusted to pH 6.1-6.4 (the optimal pH of starch hydrolysis using Ban 480 L α-amylase). Ban 480L α-amylase was weighed (0.15% of normal maize starch dry weight; 0.2% of waxy maize starch dry weight) and added to the slurry. The jar was placed in to the 80° C. water bath. After 1 hour, the cooked starch viscosity was measured to check if the converted starch was at the desirable range (for example, <10 cps at 10% solid). If not, another 0.05% Ban 480L was added to the slurry, and the cooked starch viscosity was checked again after another 15 min and 30 min. To measure the cooked starch viscosity, the slurry was cooked in a boiling water bath for 10 min, cooled to 25° C. and the cooked starch viscosity was measured at 25° C. by a Brookfield viscometer at 100 rpm. If the cooked starch viscosity was below the desirable range, the starch solution was put into a boiling water bath and heated at 95-100° C. for 10-15 min. After which, the slurry was cooled to room temperature. The converted starch was collected by spray drying (LPG-5 model; Jiangsu Fanqun Drying Equipment Factory, Jiangsu, China).

Gel permeation chromatography (GPC). Each sample (4 mg) was dissolved in 4 ml of dimethyl sulfoxide (DMSO) containing lithium bromide (0.5% w/w). The mixture was stirred in a boiling water bath for 24 hours, cooled to room temperature, filtered through a 0.45 μm filter and then injected into a PL-GPC 220 instrument (Polymer Laboratories, Inc., Amherst, Mass., USA) equipped with three Phenogel columns and a guard column (Phenomenex, Inc., Torrance, Calif., USA). The eluent was DMSO containing 0.5% (w/w) LiBr, and the flow rate was 0.8 ml/min. Temperature was controlled at 80° C. Pullulan standards were used for universal calibration.

The results are shown in Table 3, below. "MC %" refers to moisture content as a weight percentage. "HP %" refers to hydroxypropyl group as a weight percentage. "DS" refers to the degree of PO substitution.

TABLE 3

Degraded PO starches

| No. | Material | Treatment | MC (%) | HP % | DS | Cooked Starch Viscosity (10% solids, Brookfield, 100 rpm, 25° C.) | Cooked Starch Viscosity (5% solids, Brookfield, 100 rpm, 25° C.) | MW Averages* | | |
|---|---|---|---|---|---|---|---|---|---|---|
| | | | | | | | | Mn | Mw | PD |
| 1 | Normal corn | AC (3% HCl at 50° C. in 8 h) + 5% PO (at 45° C.) | 8.09 | 2.16 | 0.056 | 80.0 cps | 20.0 cps | — | — | — |
| 2 | | AC (3% HCl at 50° C. in 8 h) + 8% PO (at 45° C.) | 6.96 | 3.10 | 0.082 | 81.5 cps | 21.0 cps | — | — | — |
| 3 | | AC (3% HCl at 50° C. in 8 h) + 10% PO (at 45° C.) | 7.53 | 4.55 | 0.117 | 97.0 cps | 24.0 cps | — | — | — |
| 4 | | 10% PO (at 50° C.) + AC (5% HCl at 40° C. in 10 h) | 8.90 | 5.42 | 0.157 | 450.0 cps | 105.0 cps | — | — | — |
| 5 | | AC (3% HCl at 50° C. in 12 h) + 10% PO (at 50° C.) | 12.13 | 6.49 | 0.191 | 48.5 cps | 7.5 cps | — | — | — |
| 6 | | AC (3% HCl at 50° C. in 10 h) + 10% PO (at 50° C.) | 9.94 | 6.88 | 0.203 | 88.5 cps | 13.0 cps | — | — | — |
| 7 | | AC (6% HCl at 50° C. in 6 h) + 10% PO (at 50° C.) | 13.25 | 7.31 | 0.216 | 72.0 cps | — | 146789 | 657820 | 4.5 |
| 8 | | 10% PO (at 50° C.) + enzyme (0.2% Ban480L at 80° C. in 1 h) | 4.20 | 7.50 | 0.223 | 4.0 cps | — | 2891 | 51255 | 17.7 |
| 9 | Waxy corn | AC (3% HCl at 50° C. in 12 h) + 10% PO (at 43.5° C.) | 10.38 | 5.11 | 0.148 | 28.5 cps | 6.0 cps | — | — | — |
| 10 | | 10% PO (at 43.5° C.) + enzyme (0.1% Ban480L at 80° C. in 2 h) | 5.39 | 7.76 | 0.231 | 35.0 cps | 7.0 cps | — | — | — |
| 11 | | 10% PO (at 43.5° C.) + enzyme (0.2% Ban480L at 80° C. in 1 h, add extra 0.1% Ban480L in 15 min) | 4.43 | 7.37 | 0.219 | 4.0 cps | — | 3032 | 62538 | 20.6 |
| 12 | | | 4.96 | 7.34 | 0.218 | 5.0 cps | — | — | — | — |
| 13 | | 10% PO (at 43.5° C.) + enzyme (0.2% Ban480L at 80° C. in 1 h, add extra 0.05% Ban480L in 15 min | 5.84 | 7.42 | 0.220 | 10.0 cps | — | 97878 | 322300 | 3.3 |
| 14 | | | 4.88 | 7.43 | 0.221 | 11.0 cps | — | 136447 | 408822 | 3.0 |
| 15 | Ethylex® 2020 | 10% PO at 45° C. | 9.98 | 5.91 | 0.172 | 61.5 cps | 9.0 cps | — | — | — |
| 16 | | 10% PO at 40° C. | 10.08 | 5.74 | 0.167 | 52.5 cps | 6.0 cps | — | — | — |

*Mn, number average molecular weight (MW); Mw, weight average MW; PD, polydispersity, Mw/Mn.

The molecular size distribution for various PO-modified starch samples in Table 3 is illustrated in FIG. 1. Starch A (Ethylex® 2020), Starch B (Ethylex® 2035), Starch C (Ethylex® 2025) are commercial starch samples manufactured by Tate & Lyle PLC and used herein as references for this plot.

Example 2: Properties of Paper with Coatings Containing Conventional Starch Binders with a Low DS or No DS Materials:

Three commercially available coating starch binders were formulated into a coating composition that can be used in the manufacture of coated paper. These starch binders were from three classes of starch coating binders known as hydroxyethylated starches, thermally modified starches, and acetylated starches. While various molecular weights of these starches are available, low viscosity versions (cooked starch viscosity of 10-40 cps, 10 wt % solids, 25° C., 100 rpm using a Brookfield viscometer) were chosen for this example, as they would give the greatest probability of reaching acceptable coating viscosities at higher coating solids desired in these applications (64-70 wt %). Also, at the low viscosity levels, starches can be cooked at solids levels that are attractive to those experienced in the art of manufacturing coated papers (32-35 wt %).

The hydroxy-ethylated starch used for the Control and Coating 1 was Ethylex® 2020 manufactured by Tate & Lyle PLC, the thermally modified starch used in Coatings 2, 3 and 4 was C-Star® Film 07311 manufactured by Cargill Incorporated, and the acetylated starch used in Coating 5 was Exelcoat 65 manufactured by SMS Corporation. Ethylex® 2020 has a DS of less than 0.1, and thermally modified starches such as C-Star® Film 07311 have a DS of zero due to the nature of thermal modification. Acetylated starches such as Exelcoat 65 have DSs of less than 0.1.

These binders were added to coating compositions at various levels as shown in Table 4. As compared to the Control composition (based on a typical formulation for coated paper), the latex level in each coating was reduced to maintain a similar total binder content. The coating compositions contains multiple pigments, co-binder and additives that are well known to those experienced in the art of manufacturing coated papers. In some cases, a plasticizer was added to the composition, as it is well known that starch binders will inhibit paper gloss development. The higher the percentage of starch present in the total binder system typically results in a greater degradation of paper gloss development. Typically, if starch is 10-30% of the binder system, paper glossing trends are reasonable, especially if a plasticizer is included in the formulation. However, if higher percentages of starch are added, the degradation of coating rheology, paper gloss development and other key paper characteristics are rendered unacceptable.

Coating Test Results:

The various paper coatings were tested to determine if rheology at higher starch content could match that of a typical formulation (designated Control in Table 4). Coatings 1-5 used the same formulation as the Control except the amounts of latex, starch and plasticizer were varied. Table 4 demonstrates how coating viscosity values (Brookfield and Hercules viscosities) increase at higher starch content, especially at very high starch content (Coatings 1, 3 and 4 with 6 parts of starch and 4.5 parts of latex).

TABLE 4

| Starch Type | Hydroxy Ethylated | | Thermally Modified | | | Acetylated |
|---|---|---|---|---|---|---|
| Coating Description | Control | Coating 1 | Coating 2 | Coating 3 | Coating 4 | Coating 5 |
| Precipitated Calcium Carbonate | 27 | 27 | 27 | 27 | 27 | 27 |
| Ground Calcium Carbonate | 63 | 63 | 63 | 63 | 63 | 63 |
| Clay | 10 | 10 | 10 | 10 | 10 | 10 |
| Styrene-Butadiene Latex | 9.0 | 4.5 | 6.5 | 4.5 | 4.5 | 6.5 |
| Starch | 1.5 | 6.0 | 3.5 | 6.0 | 6.0 | 3.5 |
| Plasticizer | 0.44 | 1.76 | 1.00 | 1.76 | 0 | 1.00 |
| Organic Dispersant | 0.06 | 0.06 | 0.06 | 0.06 | 0.06 | 0.06 |
| Optical Brightener | 0.074 | 0.074 | 0.074 | 0.074 | 0.074 | 0.074 |
| Defoamer | 0.051 | 0.051 | 0.051 | 0.051 | 0.051 | 0.051 |
| Calcium Stearate Lubricant | 0.5 | 0.5 | 0.5 | 0.5 | 0.5 | 0.5 |
| Cross-Linker | 0.03 | 0.03 | 0.03 | 0.03 | 0.03 | 0.03 |
| Coating dry parts are shown above | | | | | | |
| Actual measured coating solids (%) | 68.3% | 65.9% | 70.7% | 69.5% | 69.7% | 67.1% |
| 20 rpm Brookfield Viscosity* (cps) | 1300 | 3840 | 2400 | 3260 | 3940 | 2610 |
| 100 rpm Brookfield Viscosity* (cps) | 470 | 1410 | 850 | 1270 | 1450 | 820 |
| 8800 rpm Hercules** (cps), FF Bob | 41 | 47 | 63 | 57 | 56 | 36 |
| pH | 7.9 | 8.0 | 7.8 | 7.9 | 7.9 | 7.9 |
| Temp (° C.) | 33 | 34 | 33 | 34 | 34 | 35 |

*Measured using TAPPI T-648 om-97, section 7.5.
**Measured using TAPPI T-648 om-97, section 7.6 (test modified by using the $2^{nd}$ trace, not the $1^{st}$ one)

Coating Method:

Coated papers were prepared using a commercial 97.7 gsm precoated basepaper. Coatings were applied to this substrate at 13.3 gsm per side utilizing a trailing bevel blade coater. Coated sheets were dried at 700° Fahrenheit for 6 seconds. Coated sheets were conditioned overnight to arrive at a similar moisture content, and then super-calendered on a laboratory calender at 300° Fahrenheit at a nip pressure of 450 PLI. Only one nip was required to achieve a paper gloss level of 70 gloss for the Control. Coatings 1-5 were also calendered at one nip, so paper property comparatives could be made. Coated and calendered papers were then conditioned overnight at TAPPI conditions (50% relative humidity/73.4° Fahrenheit) prior to paper testing.

Paper Testing Results:

The methods used in paper testing can be found in Table 2 above. Results from relevant plain paper and printed paper testing are shown in the Table 5.

TABLE 5

| Paper Test | Control | Coating 1 | Coating 2 | Coating 3 | Coating 4 | Coating 5 |
|---|---|---|---|---|---|---|
| Paper Gloss - 75 Degrees | 71 | 66 | 71 | 68 | 67 | 70 |
| Parker Print Surf Roughness 10 KG Soft | 0.89 | 0.99 | 0.89 | 0.94 | 0.95 | 0.94 |
| Geometric Lorentzen & Wettre Stiffness | 0.19 | 0.23 | 0.20 | 0.24 | 0.22 | 0.22 |
| Ink Gloss - 20 Degrees | 66 | 58 | 64 | 58 | 57 | 60 |
| No. Printing Passes at Failure | 10 | 8 | 8 | 8 | 7 | 8 |
| Rate of Ink Tack Build-up | 5.2 | 7.3 | 7.3 | 7.6 | 9.5 | 7.4 |
| Ink Force at Failure Point | 578 | 597 | 596 | 617 | 629 | 605 |
| IGT - Print Velocity at Failure | 2.26 | 2.11 | 2.04 | 2.27 | 2.10 | 2.03 |

It can be observed that several paper and printed paper test results deteriorated as the starch binder content increased regardless of these starch types (Coatings 1, 3 and 4). Most notable are the losses in smoothness (Parker Print Surf Roughness wherein a lower value indicates smoother surface) and paper and ink gloss at the highest starch content, even when a plasticizer was used in the formulations. The Rate of Ink Tack Build-up which measures paper surface interactivity with the inks also increased with increased starch content. A corresponding decrease in the number of printing passes to failure was also seen. In today's printing industry, where paper may be subject to up to 12 printing passes in a printing job, this decrease would be a detrimental result, adversely affecting the efficiency of the printing process. Coated paper stiffness (Geometric Lorentzen & Wettre Stiffness) levels increased with higher starch content.

Example 3: Properties of Paper with Coatings Containing a Starch Binder with a High DS and a Cooked Starch Viscosity of 4.0 cps Materials:

The starches used for Example 3 are commercially available hydroxy ethylated starches for the Control and Coating A (Ethylex® 2020 manufactured by Tate & Lyle PLC, derived from dent corn starch), and two highly modified hydroxy propylated (HP) starches, derived from dent and waxy corn starches, for Coatings B and C, respectively. The starches used for the Control and Coating A are considered modified but have low degrees of substitution (DS), i.e., less than 0.1. The HP starches had DS ranging from 0.219 to 0.223 as determined by H-NMR and shown in Table 6. The HP starches were made in accordance with the processes described in U.S. Pat. Nos. 3,378,546, 4,425,452, and Published PCT Application No. 2015/183939A1. The reaction conditions and the resulting starches, designated HP-1 and HP-2 and corresponding to sample nos. 8 and 11, respectively, in Table 3, are detailed in Table 6. The viscosities of the cooked starches are also listed.

TABLE 6

Reaction Conditions and Resulting Starches

| Starch | Native Starch | Reaction Condition* | DS | Cooked Starch Viscosity** (cps) |
|---|---|---|---|---|
| HP-1 | Dent | 10% PO + Enzyme | 0.223 | 4.0 |
| HP-2 | Waxy | 10% PO + Enzyme | 0.219 | 5.0 |

*PO is Propylene Oxide.
**viscosity measured at 10 wt % solids, 100 rpm, 25° C. using a Brookfield viscometer Coating Test Results:

As shown in Table 7, the rheology of Coatings B and C containing the high DS modified starches (i.e., HP-1 and HP-2) showed comparable viscosity response (Brookfield and Hercules) than the Control but at significantly higher solids level. The coatings solids for Coatings B and C were almost 3% higher than the Control and Coating A.

Higher solids coatings are desirable for paper coatings from a paper quality, environmental, and economic standpoint. A high solids coating will result in faster immobilization of the coating pigments and hence better hold-out of the coating layer on the paper surface. This leads to a more uniform coated surface, a more uniform coating binder distribution at the surface from reduced binder migration into the basepaper and provides better optical characteristics (gloss, smoothness, etc.) and printability to the coated papers. In addition, a higher solids coating will provide significant savings in energy costs by reducing the amount of drying required for the coated paper.

TABLE 7

| | Starch Type | | | |
|---|---|---|---|---|
| | Hydroxy Ethylated | | HP-1 | HP-2 |
| Coating Description | Control | Coating A | Coating B | Coating C |
| Starch DS Level | <0.1 | | 0.223 | 0.219 |
| Cooked Starch Viscosity Level (cps, 10% solids, 100 rpm, 25° C. using a Brookfield viscometer) | 40.0 | | 4.0 | 4.0 |
| Precipitated Calcium Carbonate | 27 | 27 | 27 | 27 |
| Ground Calcium Carbonate | 58 | 58 | 58 | 58 |
| Clay | 15 | 15 | 15 | 15 |
| Styrene Butadiene Latex | 9.0 | 4.5 | 4.5 | 4.5 |
| Starch | 1.5 | 6.0 | 6.0 | 6.0 |
| Plasticizer | 0.44 | — | — | — |
| Optical Brightener | 0.07 | 0.07 | 0.07 | 0.07 |
| Defoamer | 0.07 | 0.07 | 0.07 | 0.07 |
| Calcium Stearate Lubricant | 0.5 | 0.5 | 0.5 | 0.5 |
| Cross-Linker | 0.050 | 0.050 | 0.050 | 0.050 |
| Coating dry parts are shown above | | | | |
| Actual measured coating solids (%) | 66.8% | 66.8% | 69.3% | 69.7% |
| 20 rpm Brookfield Viscosity* (cps) | 1,500 | 9,720 | 1,350 | 1,640 |
| 100 rpm Brookfield Viscosity* (cps) | 553 | 3,000 | 532 | 605 |
| pH | 7.6 | 7.9 | 8.0 | 8.0 |
| Temp (° C.) | 34 | 36 | 35 | 35 |

*Measured using TAPPI T-648 om-97, section 7.5.

Coating Method:

Coated papers were prepared as detailed in Example 2.

Paper Testing Results:

The methods used in paper testing can be found in Table 2 above. Results from the relevant plain paper and printed paper testing are shown in Table 8. Table 8 does not include paper testing results for Coating A because the viscosity for Coating A in Table 7 was too high to provide accurate data for these tests.

TABLE 8

| Paper Test | Control | Coating B | Coating C |
|---|---|---|---|
| Paper Gloss - 75 Degrees | 69.3 | 75.9 | 75.9 |
| Parker Print Surf Roughness 10 KG Soft | 0.99 | 0.94 | 0.94 |
| Geometric Lorentzen & Wettre Stiffness | 4.5 | 4.7 | 4.8 |
| Ink Gloss - 20 Degrees | 68.8 | 75.2 | 77.8 |
| No. Printing Passes at Failure | 9.3 | 10 | 10 |
| Rate of Ink Tack Build-up | 5.9 | 4.7 | 4.3 |
| Ink Force at Failure Point | 578 | 514 | 485 |
| IGT - Print Velocity at Failure | 1.72 | 2.23 | 2.04 |
| Adams Wet Rub (% transmittance) | 99 | 99 | 99 |

The water sensitivity tests showed comparable wet strengths (Adams Wet Rub) for the paper coated with the Control with the full amount of synthetic latex (9.0 parts) and the papers coated with Coatings B and C containing the modified high DS starch and half the amount of latex (4.5 parts). The paper gloss and ink gloss of the papers coated with Coatings B and C containing the modified high DS starch were greater than the glosses of the papers coated with the Control, even in the absence of plasticizers. In addition, the papers coated with Coatings B and C were also found to be smoother (Parker Print Surf Roughness wherein a lower value indicates smoother surface) than the papers coated with the Control. The improved gloss and smoothness values may have resulted in part from being able to formulate the modified high DS starch containing coatings at higher coating solids compared to the low DS starch coatings. The results for the other paper properties for papers coated with Coatings B and C, such as IGT—Print Velocity at Failure, Rate of Ink Tack Build-up, and No. Printing Passes at Failure, are considered acceptable for coated printing paper and paperboard. These studies were repeated and the observed results were found to be repeatable.

The results show that when a high DS, viscosity optimized starch replaces a low DS starch and a portion of synthetic latex in a paper coating formulation, the resulting coated paper exhibits improved paper gloss, ink gloss, and smoothness without detrimental changes in other paper properties. In contrast, when a low DS starch replaces a significant portion of synthetic latex in a paper coating formulation, the resulting coated paper exhibits reduced paper glossiness, ink glossiness, and smoothness and detrimental changes in other paper properties, such as the rate of ink tack build-up and number of printing passes at failure, were observed (e.g., compare the Control to Coating 1 in Table 5 and Coating 2 to Coatings 3 and 4 in Table 5).

Example 4: Properties of Paper with Coatings Containing a Starch Binder with a High DS and Cooked Starch Viscosities of 10 to 28.5 cps Materials:

The starches used for Example 4 are commercially available hydroxy ethylated starches for the Control and Coating A (Ethylex® 2020 manufactured by Tate & Lyle PLC, derived from dent corn starch), and two highly modified hydroxy propylated (HP) starches, derived from waxy corn starch, for Coatings D and E. The starches used for the Control and Coating A are considered modified but have low degrees of substitution (DS), i.e., less than 0.1. The HP starches had DS ranging from 0.148 to 0.220 as determined by H-NMR and shown in Table 9. The HP starches were made in accordance with the processes described in U.S. Pat. Nos. 3,378,546, 4,425,452, and Published PCT Application No. 2015/183939A1. The reaction conditions and the resulting starches, designated HP-3 and HP-4 and corresponding to sample nos. 13 and 9, respectively, in Table 3, are detailed in Table 9. The viscosities of the cooked starches are also listed.

TABLE 9

Reaction Conditions and Resulting Starches

| Starch | Native Starch | Reaction Condition* | DS | Cooked Starch Viscosity** (cps) |
|---|---|---|---|---|
| HP-3 | Waxy | 10% PO + Enzyme | 0.220 | 10.0 |
| HP-4 | Waxy | Acid + 10% PO | 0.148 | 28.5 |

*PO is Propylene Oxide.
**viscosity measured at 10% solids, 100 rpm, 25° C. using a Brookfield viscometer Coating Test Results:

As shown in Table 10, the rheology of the Coatings D and E containing the high DS modified starches (i.e., HP-3 and HP-4) showed higher viscosity responses (Brookfield and Hercules) than the Control at equivalent solids but still within a range used by practitioner skilled in the art.

TABLE 10

| | Starch Type | | | |
|---|---|---|---|---|
| | Hydroxy Ethylated | | HP-3 | HP-4 |
| Coating Description | Control | Coating A | Coating D | Coating E |
| Starch DS Level | <0.1 | | 0.220 | 0.148 |
| Cooked Starch Viscosity Level (cps, 10% solids, 100 rpm, 25° C. using a Brookfield viscometer) | 40.0 | | 10.0 | 28.5 |
| Precipitated Calcium Carbonate | 27 | 27 | 27 | 27 |
| Ground Calcium Carbonate | 58 | 58 | 58 | 58 |
| Clay | 15 | 15 | 15 | 15 |
| Styrene Butadiene Latex | 9.0 | 4.5 | 4.5 | 4.5 |
| Starch | 1.5 | 6.0 | 6.0 | 6.0 |
| Plasticizer | 0.44 | — | — | — |
| Optical Brightener | 0.07 | 0.07 | 0.07 | 0.07 |
| Defoamer | 0.07 | 0.07 | 0.07 | 0.07 |
| Calcium Stearate Lubricant | 0.5 | 0.5 | 0.5 | 0.5 |
| Cross-Linker | 0.050 | 0.050 | 0.050 | 0.050 |
| Coating dry parts are shown above | | | | |
| Actual measured coating solids (%) | 66.8% | 66.8% | 66.9% | 66.9% |
| 20 rpm Brookfield Viscosity* (cps) | 1,500 | 9,720 | 2,245 | 3,810 |
| 100 rpm Brookfield Viscosity* (cps) | 553 | 3,000 | 787 | 1,436 |
| 4400 rpm Hercules** (cps), E Bob | 39.2 | 82.1 | 63.4 | 86.4 |
| pH | 7.6 | 7.9 | 8.0 | 8.0 |
| Temp (° C.) | 34 | 36 | 35 | 37 |

*Measured using TAPPI T-648 om-97, section 7.5.
**Measured using TAPPI T-648 om-97, section 7.6 (test modified by using the $2^{nd}$ trace, not the $1^{st}$ one)

Coating Method:

Coated papers were prepared as detailed in Example 2.

Paper Testing Results:

The methods used in paper testing can be found in Table 2 above. Results from relevant plain paper and printed paper testing are shown in Table 11. Table 11 does not include paper testing results for Coating A because the viscosity for Coating A in Table 10 were too high to provide accurate data for these tests.

TABLE 11

| Paper Test | Control | Coating D | Coating E |
|---|---|---|---|
| Paper Gloss - 75 Degrees | 69.3 | 72.9 | 70.7 |
| Parker Print Surf Roughness 10 KG Soft | 0.99 | 0.97 | 0.97 |
| Geometric Lorentzen & Wettre Stiffness | 4.5 | 4.7 | 4.7 |
| Ink Gloss - 20 Degrees | 68.8 | 71.1 | 72.1 |
| No. Printing Passes at Failure | 9.3 | 10 | 10 |
| Rate of Ink Tack Build-up | 5.9 | 4.9 | 2.7 |
| Ink Force at Failure Point | 578 | 520 | 434 |
| IGT - Print Velocity at Failure | 1.72 | 1.86 | 1.75 |
| Adams Wet Rub (% transmittance) | 99 | 99 | 98 |

The water sensitivity tests showed comparable wet strengths (Adams Wet Rub) for the paper coated with the Control with the full amount of synthetic latex (9.0 parts) and the papers coated with Coatings D and E containing the modified high DS starch and half the amount of latex (4.5 parts). The paper gloss and ink gloss of the papers coated with Coatings D and E containing the modified high DS starch were greater than the glosses of the papers coated with the Control, even in the absence of plasticizers. In addition, the papers coated with Coatings D and E were also found to be smoother (Parker Print Surf Roughness wherein a lower value indicates smoother surface) than the papers coated with the Control. The results for the other paper properties for papers coated with Coatings D and E, such as IGT—Print Velocity at Failure, Rate of Ink Tack Build-up, and No. Printing Passes at Failure, are considered acceptable for coated printing paper and paperboard. These studies were repeated and the observed results were found to be repeatable.

The results show that when a high DS, viscosity optimized starch replaces a low DS starch and a portion of synthetic latex in a paper coating formulation, the resulting coated paper exhibits improved paper gloss, ink gloss, and smoothness without detrimental changes in other paper properties. In contrast, when a low DS starch replaces a significant portion of synthetic latex in a paper coating formulation, the resulting coated paper exhibits reduced paper glossiness, ink glossiness, and smoothness and detrimental changes in other paper properties, such as the rate of ink tack build-up and number of printing passes at failure, were observed (e.g., compare the Control to Coating 1 in Table 5 and Coating 2 to Coatings 3 and 4 in Table 5).

Figure 3:
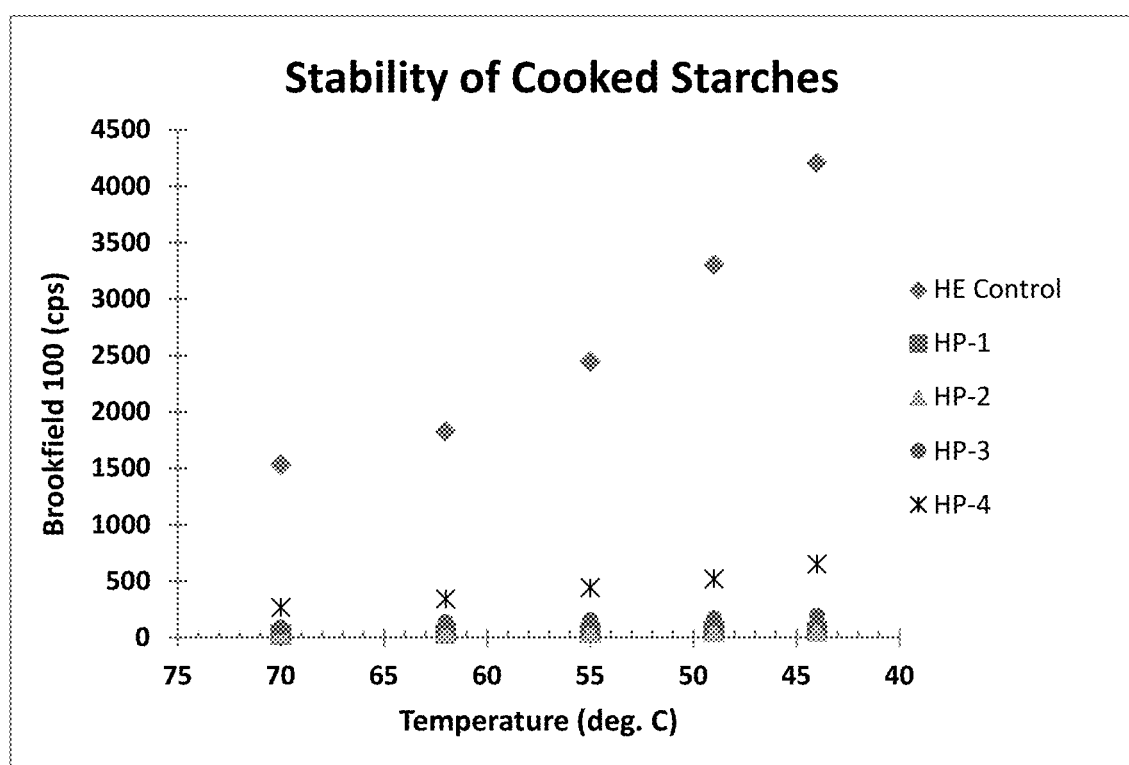
FIG. 3 is a graph showing the Brookfield viscosities (measured at 30 wt % solids, 100 rpm) of cooked starches as they cooled and provides measures of the stabilities of the starches over time. The viscosities were measured at the temperatures indicated in the graph.

Example 5: Stabilities of Cooked Starches with High DS and of Coatings Containing Such Starches The stabilities of a commercially available hydroxy ethylated starch, HE Control, (Ethylex® 2020 manufactured by Tate & Lyle PLC, derived from dent corn starch) and the highly modified hydroxy propylated (HP) starches used in Examples 3 and 4 (specifically, HP-1, HP-2, HP-3 and HP-4) were evaluated. Each of the starches was cooked at 90-95° C. for 15 minutes to obtain a cooked starch (30 wt % solids). FIG. 3 is a graph of Brookfield viscosity (measured at 30% solids, 100 rpm) for the 5 starches, measured as each cooked starch cooled to particular temperatures. The graph provides a measure of the stability of the starch over time. The Brookfield viscosity of the HE Control starch increased significantly while the Brookfield viscosities of the HP starches remained relatively flat or increased slightly. FIG. 3 demonstrates that the HP starches were stable over time.

Practitioners skilled in the art understand that a coating with a high level of starch binder (e.g., greater than about 5 parts by weight based on 100 parts by weight of total pigment) can only be stored for a limited period before the increase in coating viscosity renders the coating unusable. This is important in the manufacturing context where a production upset or problem can result in coatings left in tanks for varying amounts of time. It is desirable to formulate coatings that are stable for sufficiently long periods to withstand typical waiting periods during production.

Figure 4:
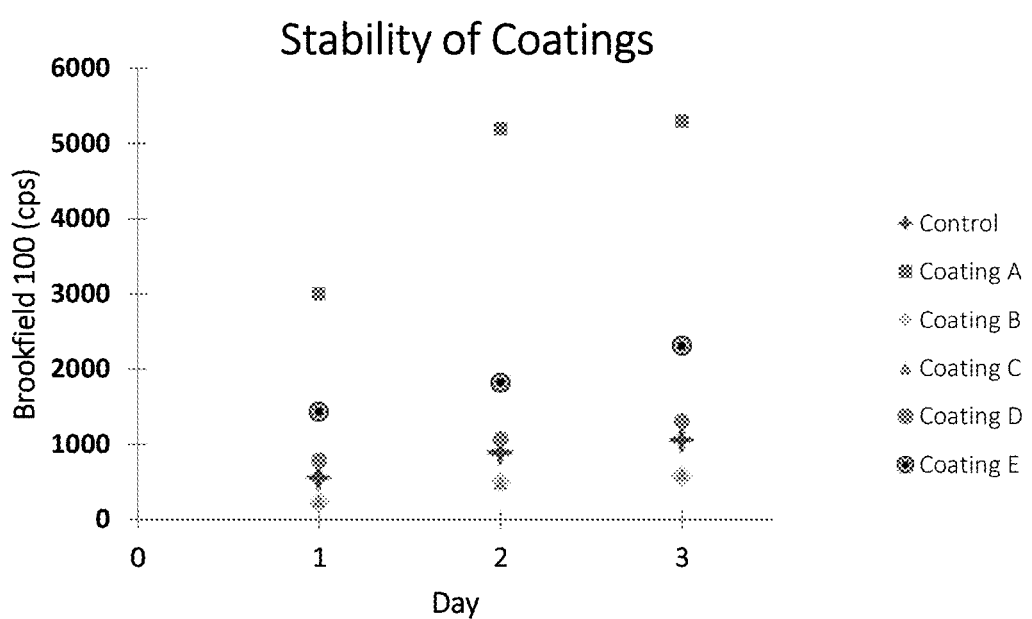
FIG. 4 is a graph showing the Brookfield viscosities (measured at 67% solids, 100 rpm, 35° C.) of paper coatings over 3 days and provides measures of the stabilities of the coatings over time.

The Brookfield viscosity (measured at 67% solids, 100 rpm, 35° C., measured using TAPPI T-648 om-97, section 7.5) for the Control and Coatings evaluated in Examples 3 and 4 was measured over 3 days. Table 12 provides the viscosity data, and FIG. 4 graphs the same data.

TABLE 12

| Starch Type | Control Viscosity (cps) Hydroxy Ethylated | Coating A Viscosity (cps) | Coating B Viscosity (cps) HP-1 | Coating C Viscosity (cps) HP-2 | Coating D Viscosity (cps) HP-3 | Coating E Viscosity (cps) HP-4 |
|---|---|---|---|---|---|---|
| Day 1 | 553 | 3,000 | 240 | 250 | 787 | 1,436 |
| Day 2 | 890 | 5,200 | 495 | 495 | 1,072 | 1,820 |
| Day 3 | 1,056 | 5,300 | 580 | 610 | 1,310 | 2,310 |

The stabilities, as measured by Brookfield viscosity, of the coatings containing 6 parts of high DS modified starches (Coatings B, C, D, and E) were stable and comparable to the Control which had 1.5 parts of low DS starch by weight based on 100 parts by weight of total pigment. In contrast, Coating A which contained 6 parts of low DS starch by weight based on 100 parts by weight of total pigment exhibited a significant increase in viscosity after one day.

Any patents or publications mentioned in the specification are indicative of the level of those skilled in the art. Patents or publications mentioned in the specification are herein incorporated by reference in their entirety to the same extent as if each individual publication was specifically and individually indicated to be incorporated by reference.

The compositions, apparatus, and methods of the appended claims are not limited in scope by the specific compositions, apparatus, and methods described herein, which are intended as illustrations of a few aspects of the compositions, apparatus, and methods of the claims and any compositions, apparatus, and methods which are functionally equivalent are within the scope of this disclosure. Various modifications of the compositions, apparatus, and methods in addition to those shown and described herein will become apparent to those skilled in the art and are intended to fall within the scope of the appended claims. Further, while only certain representative combinations of the compositions, apparatus, and of the method steps disclosed herein are specifically described, other combinations of the apparatus components and method steps will become apparent to those skilled in the art and also are intended to fall within the scope of the appended claims. Thus a combination of components or steps may be explicitly mentioned herein; however, all other combinations of components and steps are included, even though not explicitly stated. The term comprising and variations thereof as used herein is used synonymously with the term including and variations thereof and are open, non-limiting terms.

What is claimed is:

1. A coating composition comprising:
    a hydroxyalkylated starch and at least one pigment,
    wherein the hydroxyalkylated starch has a degree of substitution from 0.12 to 3 and a cooked starch viscosity of 4 to 20 cps and the viscosity is measured at 10 wt % solids, 100 rpm and 25° C. using a Brookfield viscometer.

2. The coating composition of claim 1, wherein the degree of substitution (DS) is from 0.12 to 0.3.

3. The coating composition of claim 1, wherein the coating composition is 1 to 15 parts by weight of hydroxyalkylated starch based on 100 parts by weight of total pigment.

4. The coating composition of claim 1 further comprising a synthetic latex.

5. The coating composition of claim 4, wherein the coating composition is 3 to 18 parts by weight of synthetic latex based on 100 parts by weight of total pigment.

6. The coating composition of claim 4, wherein the parts by weight of synthetic latex based on 100 parts by weight of total pigment to the parts by weight of hydroxyalkylated starch based on 100 parts by weight of total pigment is from 9:1 to greater than 0:10.

7. The coating composition of claim 1, wherein the coating composition has 45 wt % to 72 wt % coating solids.

8. A coated product comprising:
 (a) a substrate;
 (b) a coating composition comprising a hydroxyalkylated starch and at least one pigment,
 wherein the hydroxyalkylated starch has a degree of substitution from 0.12 to 3 and a cooked starch viscosity of 4 to 20 cps, the viscosity is measured at 10 wt % solids, 100 rpm and 25° C. using a Brookfield viscometer, and the coating composition is layered on at least one surface of the substrate.

9. The coated product of claim 8, wherein the degree of substitution (DS) is from 0.12 to 0.3.

10. The coated product of claim 8, wherein the coating composition is 1 to 15 parts by weight of hydroxyalkylated starch based on 100 parts by weight of total pigment.

11. The coated product of claim 8 further comprising a synthetic latex.

12. The coated product of claim 11, wherein the coating composition is 3 to 18 parts by weight of synthetic latex based on 100 parts by weight of total pigment.

13. The coated product of claim 11, wherein the parts by weight of synthetic latex based on 100 parts by weight of total pigment to the parts by weight of hydroxyalkylated starch based on 100 parts by weight of total pigment is from 9:1 to greater than 0:10.

14. A method of coating a substrate comprising:
 coating at least one surface of a substrate with a coating composition comprising a hydroxyalkylated starch and at least one pigment,
 wherein the hydroxyalkylated starch has a degree of substitution from 0.12 to 3 and a cooked starch viscosity of 4 to 20 cps and the viscosity is measured at 10 wt % solids, 100 rpm and 25° C. using a Brookfield viscometer.

15. The method of claim 14, wherein the degree of substitution (DS) is from 0.12 to 0.3.

* * * * *